United States Patent [19]

Barnes

[11] Patent Number: 4,666,674
[45] Date of Patent: May 19, 1987

[54] APPARATUS AND PROCESS FOR SOLIDS-FLUID SEPARATION

[75] Inventor: Peter H. Barnes, The Hague, Netherlands

[73] Assignee: Shell Oil Company, Houston, Tex.

[21] Appl. No.: 864,225

[22] Filed: May 19, 1986

[30] Foreign Application Priority Data

Jun. 28, 1985 [GB] United Kingdom ............... 8516335

[51] Int. Cl.⁴ ............................................. F27B 15/08
[52] U.S. Cl. .................................... 422/144; 422/147; 55/459 R
[58] Field of Search ............. 55/459 R; 208/113, 153; 209/144; 422/144, 145, 147

[56] References Cited

U.S. PATENT DOCUMENTS

| | | | |
|---|---|---|---|
| 373,374 | 11/1887 | Morse | 55/459 R |
| 2,223,652 | 12/1940 | White | 55/461 |
| 2,718,491 | 9/1955 | Green | 208/153 |
| 2,888,096 | 5/1959 | Evans | 55/459 R |
| 2,901,420 | 8/1959 | Evans | 55/459 R |
| 3,710,558 | 1/1973 | Feder | 55/338 |
| 4,448,753 | 5/1984 | Gross | 422/145 |

FOREIGN PATENT DOCUMENTS 851483 10/1952 Fed. Rep. of Germany .
875933  5/1953 Fed. Rep. of Germany .

Primary Examiner—Bernard Nozick
Attorney, Agent, or Firm—Kimbley L. Muller

[57] ABSTRACT

An apparatus suitable for solids-fluid (e.g. cracking catalyst/hydrogen vapor) separation comprising upwardly directed feed inlet means of which the upper part cooperates substantially tangentially with a housing comprising at least a domed upper section, at least one fluid outlet means which is in fluid communication with a central section of the housing, and downwardly directed solids outlet means in communcaition with at least one solids outlet opening in a lower section of the housing. The invention further relates to a process for separating fluid catalytic cracking catalyst particles from gaseous hydrocarbon conversion products and/or flue gases using said apparatus.

9 Claims, 6 Drawing Figures

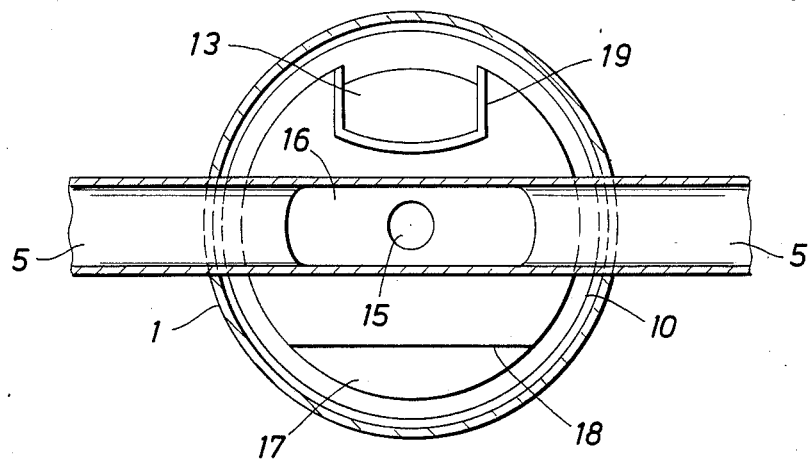
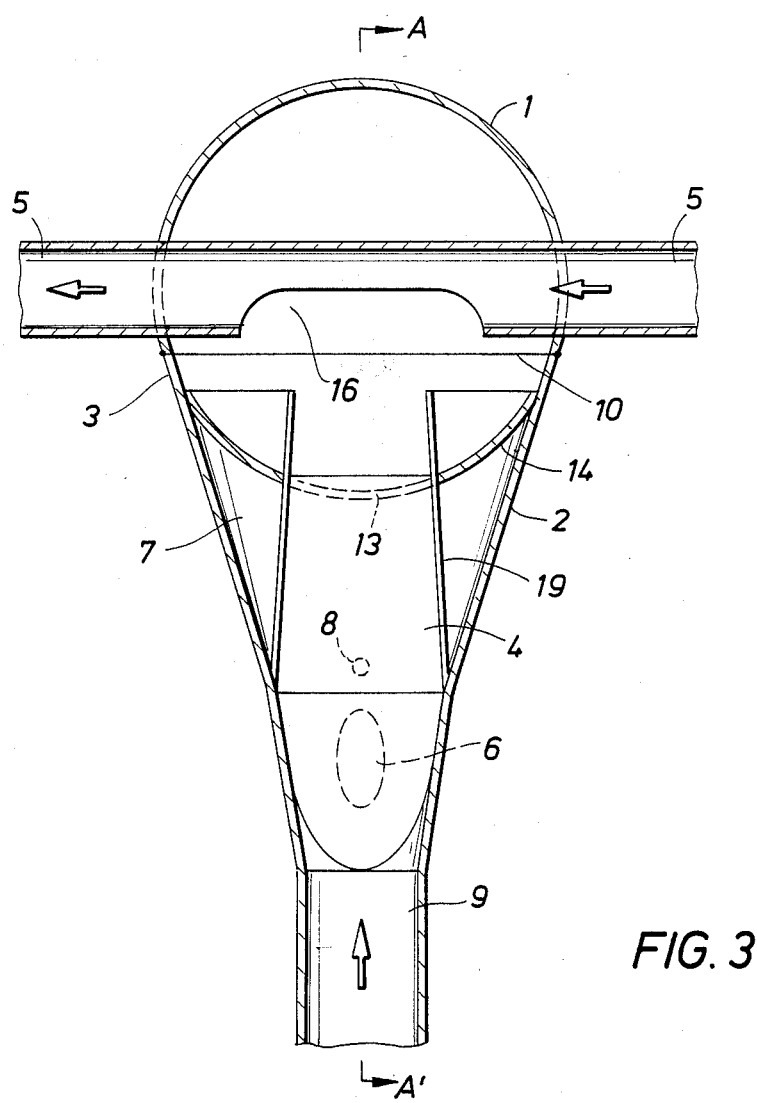

APPARATUS AND PROCESS FOR SOLIDS-FLUID SEPARATION

The present invention relates to an apparatus and a process for solids-fluid separation and to products obtained by such a process.

A well-known apparatus for solids-fluid separation, which is in particular employed for solids-vapor separation in e.g. catalytic cracking processes, is a cyclone wherein a solids-vapor feed stream is entered horizontally and tangentially in a vertical cylindrical body from which vapor is discharged at the (usually flat) top and solids are discharged from the bottom section of the cyclone.

Although cyclones as described hereinbefore are suitable for many applications, a consequence of their use for separating an upwardly flowing solids-fluid stream (e.g. a catalyst-vapor stream emanating from a catalytic cracking riser reactor) is that an approximately ninety degree deviation of the flow direction of said stream is required before entry into the cyclone. Such a deviation causes an unproductive substantial pressure drop in the solids-vapor stream.

Moreover, when such cyclones are employed outside a reactor vessel, their substantially flat tops require complex bracing in order to withstand the prevailing pressure differentials at relatively high operating temperatures (e.g. 400°–600° C. inside the cyclone). The various corners inside said cyclones (e.g. between the flat top and the cylindrical body) can form dead spots where coke formation may take place at said high temperatures during the residence period in said cyclones of e.g. hydrocarbon-containing catalyst particles which are being separated from heavy hydrocarbon vapors.

It has now surprisingly been found that these disadvantages substantially do not exist when employing the novel type of separation apparatus according to the invention comprising a domed upper section in which te upward momentum of a solids-fluid feed stream is efficiently used for separation purposes instead of dissipating energy in unproductive pressure drops.

The invention therefore relates to an apparatus suitable for solids-fluid separation comprising upwardly directed feed inlet means of which the upper part cooperates substantially tangentially with a housing comprising at least a domed upper section, at least one fluid outlet means which is in fluid communication with a central section of the housing, and downwardly directed solids outlet means in communication with at least one solids outlet opening in a lower section of the housing.

Preferably at least the domed upper section of the housing is substantially spherical, while most preferably the whole housing is substantially spherical in order to attain an optimal flow pattern of the solids and fluid streams which results in high solids separation efficiency, a relatively short solids residence time (in order to avoid undesired reactions) and a low pressure drop in the apparatus.

The apparatus according to the invention can be employed in processes wherein solids have to be separated from fluids (in particular gases at elevated temperatures and pressures) such as catalytic cracking, shale conversion processes and coal- or heavy oil gasification.

BRIEF DESCRIPTION OF THE DRAWING

FIG. 2 is a plan view of another embodiment of the apparatus of FIG. 1.

FIG. 3 is a side elevation view of the embodiment of the apparatus depicted in FIG. 2.

DETAILED DESCRIPTION OF THE INVENTION

Figure 1:
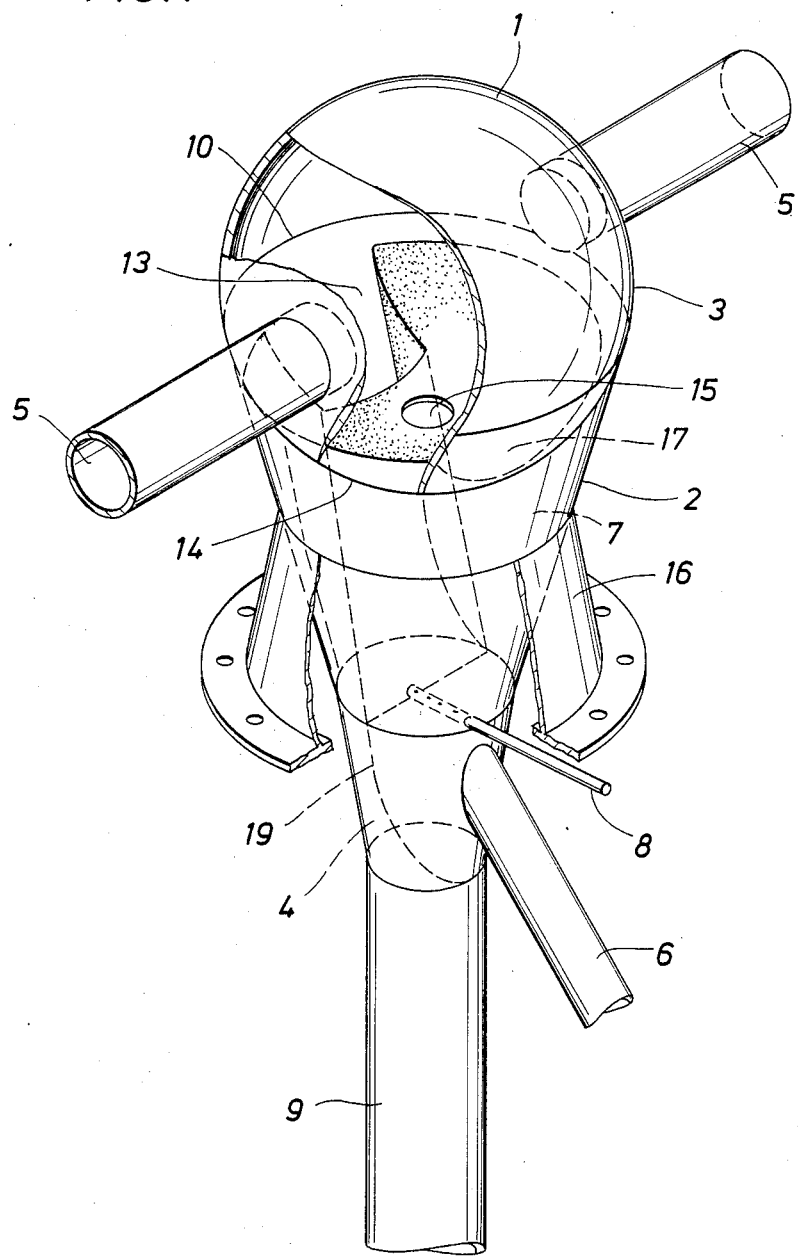
FIG. 1 is a front view of a solids-fluid contact separator of this invention.

Various embodiments of the apparatus according to the invention are described hereinafter, using FIGS. 1–6 in which reference numerals relating to corresponding parts are the same.

The apparatus depicted in FIG. 1 comprises a substantially spherical housing (1) provided with two fluid outlet means (5) in the central section (3) of the housing and a feed inlet opening (13), a fluid ventilation opening (15) and a solids outlet opening (17) in the lower section (14) of the housing. The housing (1) is partially enclosed (below line 10) by an inverted frusto-conical supporting body (2) which is connected to a feed inlet (9), a solids outlet (6) and a frusto-conical support (16). The space enclosed by the supporting body (2) is divided by a wall (19) into two sections, i.e. feed inlet (4) and solids bin (7).

Figure 4:
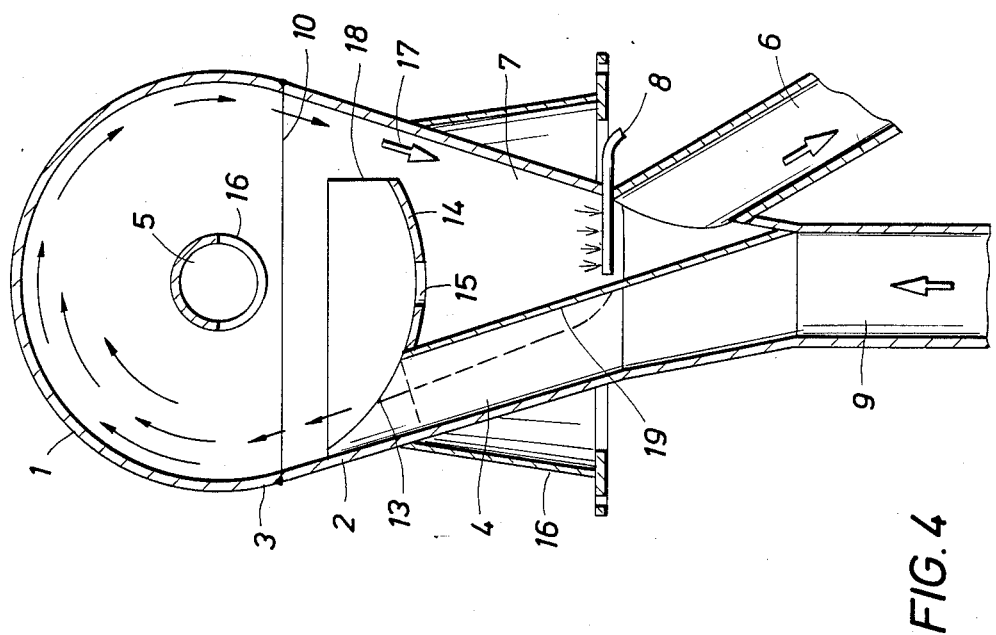
FIG. 4 is a longitudinal section view of the apparatus depicted in FIG. 3 taken along lines A'—A'.

In FIGS. 2–4 an apparatus is shown which is similar to that of FIG. 1, except for the fluid outlet means (5) forming a tube with an opening (16) in the lower central part thereof.

FIG. 1 represents a suitable embodiment of an apparatus according to the invention. Such a design does not only provide a compact and structurally strong apparatus, it also suitably provides a substantially enclosed solids bin (7), i.e. the part of the solids outlet means contained within the supporting body (2), wherein gas (e.g. steam) feed means (8) may be present so that interstitial and/or absorbed compounds (e.g. hydrocarbons) can be at least partially removed from the solids which have been separated in the housing (1) from the bulk of the fluid compounds leaving the housing through fluid outlet means (5).

In FIGS. 2, 3 and 4 another suitable embodiment of the apparatus according to the invention is shown. An advantage of the inverted frusto-conical support (2) in said apparatus is that the circular top-edge (10) of the support (2) cooperates with the housing (1) which results in a structurally strong apparatus and relatively simple circular connection (usually by means of welding) of the housing (1) with the supporting body (2).

The simple frusto-conical support (16) does not only support the separation apparatus but also riser reactor (9), thus overcoming the need for expansion bellows which would otherwise be required in order to cope with the expansion of the riser reactor during start-up.

Figure 6:
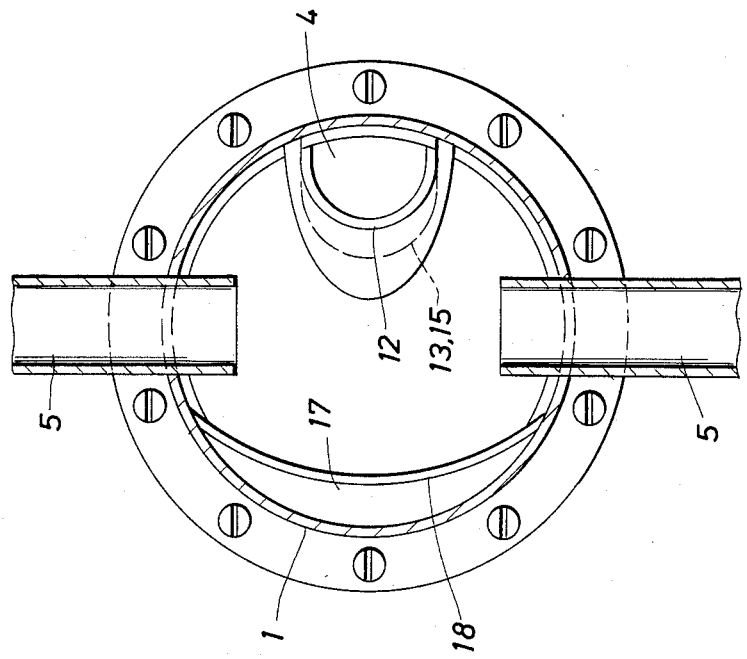
FIG. 6 is a longitudinal section view integrated with a riser reactor and a stripper vessel.
Figure 5:
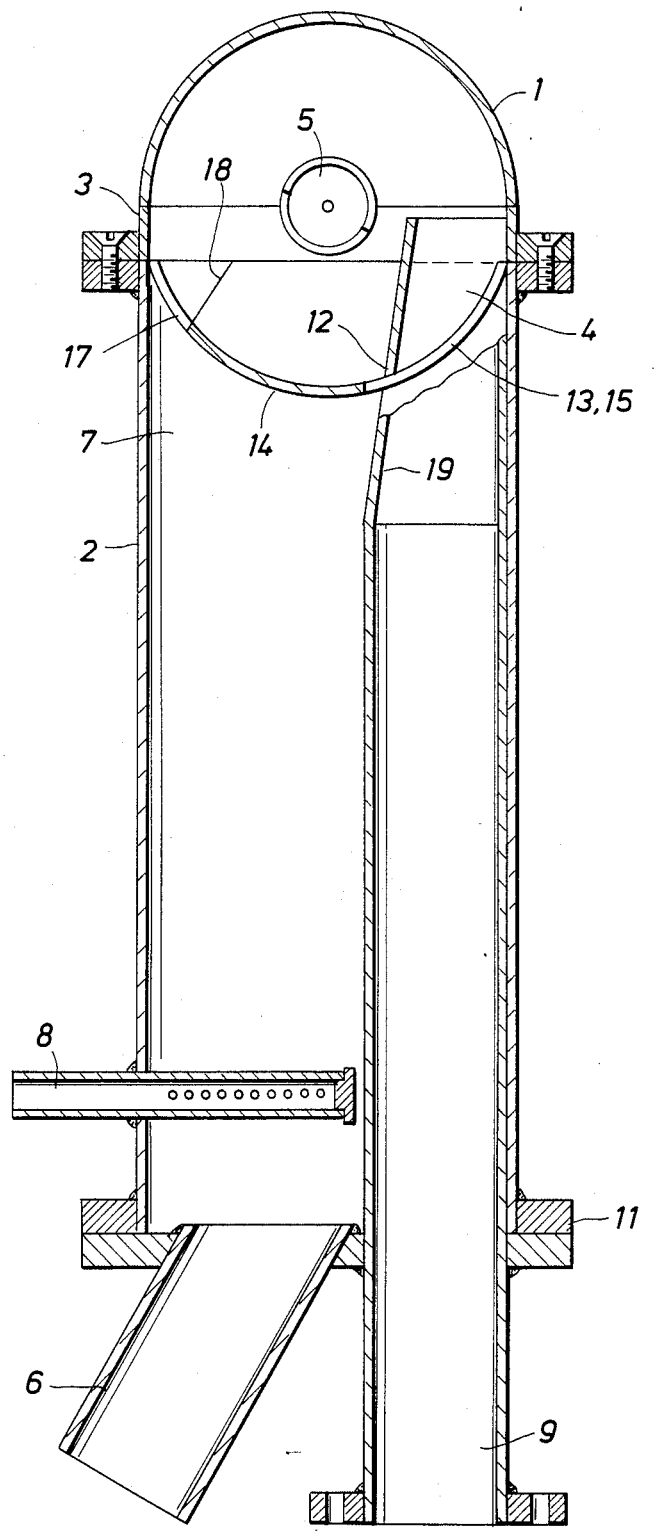
FIG. 5 is a longitudinal section view integrated with a riser reactor and a stripper vessel.

In an embodiment of the apparatus according to the invention as depicted in FIGS. 5 and 6, which is particularly preferred for application in a fluid catalytic cracking process, the supporting body (2) comprises a substantially cylindrical vessel enclosing a substantially cylindrical riser reactor (9) extending through the bottom section (11) of the vessel, the upper part (12) of the riser reactor cooperating with an opening (13) in the lower section (14) of the housing. The cylindrical vessel suitably has a length: diameter ratio of from 3–10, preferably of from 4–7 for optional stripping of hydrocarbons from cracking catalyst particles by means of steam or other stripping gases which are suitably introduced through gas feed means (8) into one or more lower sections of the vessel.

Both when the stripper vessel is integrated (see FIGS. 5 and 6) with the catalyst outlet means of the solids-fluid separation apparatus and in an embodiment where pre-stripping gas feed means are present in the catalyst bin within the supporting body of said apparatus (see FIGS. 3 and 4), the lower section (14) of the housing (1) located on top of the stripper vessel, respectively supporting body, preferably comprises at least one fluid ventilation opening (15). Through said opening (15) vapors evolving from (pre-)stripped catalyst particles can flow into the domed housing. However, the (pre-)stripper vapors can also be kept separate from the vapors originating from the riser reactor, if desired, by providing a separate vapor outlet for said (pre-)stripper vapors in an apparatus without said opening.

The apparatus according to the invention suitably comprises one, preferably two, fluid (e.g. vapor) outlet means (5) located substantially horizontally and opposite to each other in the central section (3) of the housing. A major advantage of such horizontal outlet means is that these can be directly connected to horizontal feed inlets of second stage cyclones of the conventional type without requiring ninety degree bends, as required between two conventional cyclones arranged in series. The two fluid outlet means (5) may form a tube (see FIGS. 2–4) extending through said housing and comprising at least one opening (16) preferably located at the lower central part of the tube, in order to avoid entrainment of catalyst particles by hydrocarbon vapors during start-up of the catalytic cracking process when the velocity of the catalyst particles in the dome is relatively low.

During normal operation of the apparatus according to the invention the (catalyst) particles follow a flow path in a substantially vertical plane along the inner wall of the housing and leave the housing through solids outlet opening(s) (17) in the lower section (14) of the housing. In order to avoid a flow of solids together with fluid directly from the feed inlet opening (13) via said lower section (14) of the housing to solids outlet opening (17), the latter opening (17) is suitably provided with a shim (18) (see FIGS. 4–6) which is preferably inclined at an angle of from 15 to 45 degrees with respect to a vertical plane for optimal solids deflection (see in particular FIG. 5).

The ratio of the maximum internal widths of the housing and the feed inlet means is of from 2 to 7, preferably of from 2.5 to 4.

Although the apparatus according to the invention may be employed fully enclosed by e.g. a stripper vessel comprising a riser reactor on top of which the present apparatus is located, it is preferred to locate the apparatus outside such a vessel in order to take full advantage of its structurally strong design and to provide easy access for inspection and maintenance of the separation apparatus.

The invention further relates to a process for separating fluid catalytic cracking catalyst particles from gaseous hydrocarbon conversion products which comprises passing a mixture of solid catalyst particles and hydrocarbon-containing gases upwardly and tangentially into a substantially spherical separation zone wherein the mixture is subjected to a rotating movement in a substantially vertical plane, removing catalyst particles from a lower section of the separation zone and removing hydrocarbon-containing gases from a central section of the separation zone. Apart from gaseous hydrocarbon conversion products, other gases such as flue gases or gases obtained in shale conversion processes, coal- or heavy oil gasification processes can also be separated from solid particles in the above-described manner.

Preferably, catalyst particles which have been separated by means of said process are passed to at least one stripping zone which is in gaseous communication with the separation zone, and catalyst particles are contacted in the stripping zone(s) with a stripping gas (e.g. steam).

Moreover, the invention relates to hydrocarbon conversion products prepared by a process as described hereinbefore.

The invention will be further elucidated by means of the following Example:

EXAMPLE

A feed stream of hydrocarbon vapors and cracking catalyst particles in a weight ratio of 0.15 enters feed inlet (4) of a separation apparatus as depicted in FIG. 1 at a temperature of 500° C., a pressure of 2 bar and a vapor velocity of 18 m/s. Catalyst particles are removed through solids outlet (6) with a separation efficiency of more than 98% on a weight basis, whereas hydrocarbon vapor streams comprising less than 2% by weight of catalyst particles, based on total catalyst weight in the feed stream, leave the apparatus through vapor outlets (5).

What I claim as my invention is:

1. A vertical apparatus for the separation of a solids-fluid mixed phase stream which comprises:
    a. an upwardly directed feed inlet means having an upper part for passage of said mixed phase of solids and fluid;
    b. a spherical surmounted housing having an upper section and a lower section, said feed inlet means communicating tangentially with the lower section, and containing fluid outlets located substantially horizontally and opposite one another in the upper section of said housing; and
    c. a downwardly directed solids outlet means opposite said tngential inlet means communicating with said lower section of said housing for removal of solids from said housing.

2. The apparatus of claim 1 wherein said downwardly directed solids outlet means comprises a stripping gas inlet means for entry of a stripping gas to said solids outlet.

3. The apparatus of claim 1 wherein said lower section of said housing comprises at least one fluid ventilation opening communicating with said solid outlet means.

4. The apparatus of claim 1 wherein said lower section of said housing communicates with a support means.

5. The apparatus of claim 4 wherein said support means partially comprises said upwardly directed feed inlet means.

6. The apparatus of claim 4 wherein said support means partially comprises an inverted frusto-conical body support structure.

7. The apparatus of claim 1 wherein said support means comprises a substantially cylindrical vessel having a bottom section enclosing said upwardly directed feed inlet means extending through said bottom section of said cylindrical vessel wherein said upper part of said feed inlet means communicates with said lower section of said housing.

8. The apparatus of claim 7 wherein said cylindrical vessel has a length to diameter ratio of from 3 to 10.

9. The apparatus of claim 8 wherein said length to diameter ratio is from 4 to 7.

* * * * *